(12) United States Patent
Englasyam et al.

(10) Patent No.: US 9,234,804 B2
(45) Date of Patent: Jan. 12, 2016

(54) TEMPERATURE SENSOR FOR IMAGE SENSORS

(75) Inventors: Mukesh Rao Englasyam, Andhra Pradesh (IN); Yann Desprez-Le-Goarant, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 263 days.

(21) Appl. No.: 13/339,868

(22) Filed: Dec. 29, 2011

(65) Prior Publication Data

US 2013/0170520 A1    Jul. 4, 2013

(51) Int. Cl.
*G01K 7/00* (2006.01)
*G01K 7/01* (2006.01)

(52) U.S. Cl.
CPC ...................................... *G01K 7/015* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,394,078 A | * | 2/1995 | Brokaw | 323/313 |
| 5,828,329 A | * | 10/1998 | Burns | 341/155 |
| 5,961,215 A | * | 10/1999 | Lee et al. | 374/178 |
| 6,664,847 B1 | * | 12/2003 | Ye | 327/543 |
| 6,799,889 B2 | * | 10/2004 | Pennock | 374/178 |
| 7,029,171 B2 | * | 4/2006 | Tesi et al. | 374/1 |
| 7,119,527 B2 | * | 10/2006 | Fernald | 323/315 |
| 7,728,575 B1 | * | 6/2010 | Ozalevli et al. | 323/313 |
| 8,358,119 B2 | * | 1/2013 | Kim | 323/313 |
| 2009/0302824 A1 | * | 12/2009 | Kim et al. | 323/313 |
| 2011/0043185 A1 | * | 2/2011 | Kim | 323/313 |

OTHER PUBLICATIONS

Bakker, et al: "Micropower CMOS Temperature Sensor with Digital Output," IEEE Journal of Solid-State Circuits, vol. 31, No. 7, Jul. 1996, pp. 933-937.

* cited by examiner

*Primary Examiner* — Lisa Caputo
*Assistant Examiner* — Nasir U Ahmed
(74) *Attorney, Agent, or Firm* — Gardere Wynne Sewell LLP

(57) ABSTRACT

An integrated temperature sensor provides an output current proportional to temperature rising from a zero value at a selectable reference temperature. The reference temperature can be selected by varying resistive values in the sensor's circuit. The temperature sensor can be manufactured at low cost and fully integrated on a chip using CMOS technology, and may be used for low-power applications.

29 Claims, 4 Drawing Sheets

TEMPERATURE SENSOR FOR IMAGE SENSORS

BACKGROUND

1. Technical Field

The invention relates to apparatus and methods for sensing temperature with an integrated electronic circuit. The temperature sensor and related methods may be used for sensing temperature in a multi-pixel array of an imaging device.

2. Discussion of the Related Art

Solid-state temperature sensors have been developed to be incorporated in electronic and mechanical systems to provide real-time monitoring of system temperature during operation. There are a wide variety of applications in which temperature sensors are used, ranging from environmental sensing and control, cooking devices, medical devices, consumer electronics, and machine diagnostics, control, and safety. As one simple example, temperature sensors can be used as a safety element in some applications, e.g., electrical motors, and provide a signal that will shut off an overheating system to prevent damage to the system.

Some temperature sensors are thermistor based, in which a temperature-sensitive resistor (thermistor) is used in a circuit to sense temperature, as depicted in FIG. 1 for example. The thermistor 110 can be incorporated in a voltage divider (e.g., comprised of resistor $R_i$ and thermistor 110), and an output of the divider $V_{out}$ can be provided to one input of a differential amplifier 140. A reference voltage $V_{ref}$ may be provided to a second input of the differential amplifier. Since the resistance of thermistor is a function of temperature, $V_{out}$ will be temperature dependent. $V_{out}$ will be compared with the constant reference voltage $V_{ref}$ and any deviations in due to temperature changes will be sensed by differential amplifier 140, amplified, and provided as an output voltage $V_{PT}$ that is proportional to temperature.

Though a temperature-sensing circuit such as that shown in FIG. 1 may be used in a large number of applications, it is not suitable for some applications for several reasons. One reason is that it can consume too much power for low-power applications, such as cell phones. Another reason is that it requires at least one stable and temperature-independent voltage source. Another reason is that it generally comprises large circuit elements that are not well suited for integration into micro-circuits. Also, calibration of the sensor requires control of a reference voltage source, $V_{ref}$. Additionally, if the thermistor 110 is large, the temperature response of the circuit may be slow for some applications (e.g., sensing heating due to electrical power surges).

SUMMARY

The present invention relates to fully integrated, solid state temperature sensor that can be incorporated on a chip and fabricated using CMOS technology. The sensor can be fabricated at low cost, and is configured to provide an output current rising from a zero value that is proportional to temperature. The zero crossing of the output current is tunable, and corresponds to a selectable reference temperature. In some embodiments, the zero crossing is independent of output gain of the temperature sensor. The temperature sensor may be incorporated in small electronic devices, e.g., a multi-pixel imaging sensor.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

Figure 1:
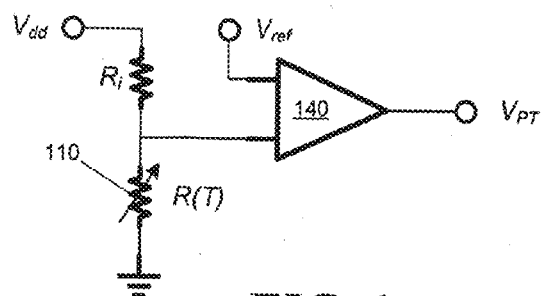
FIG. 1 depicts a thermistor-based temperature sensor.
Figure 2:
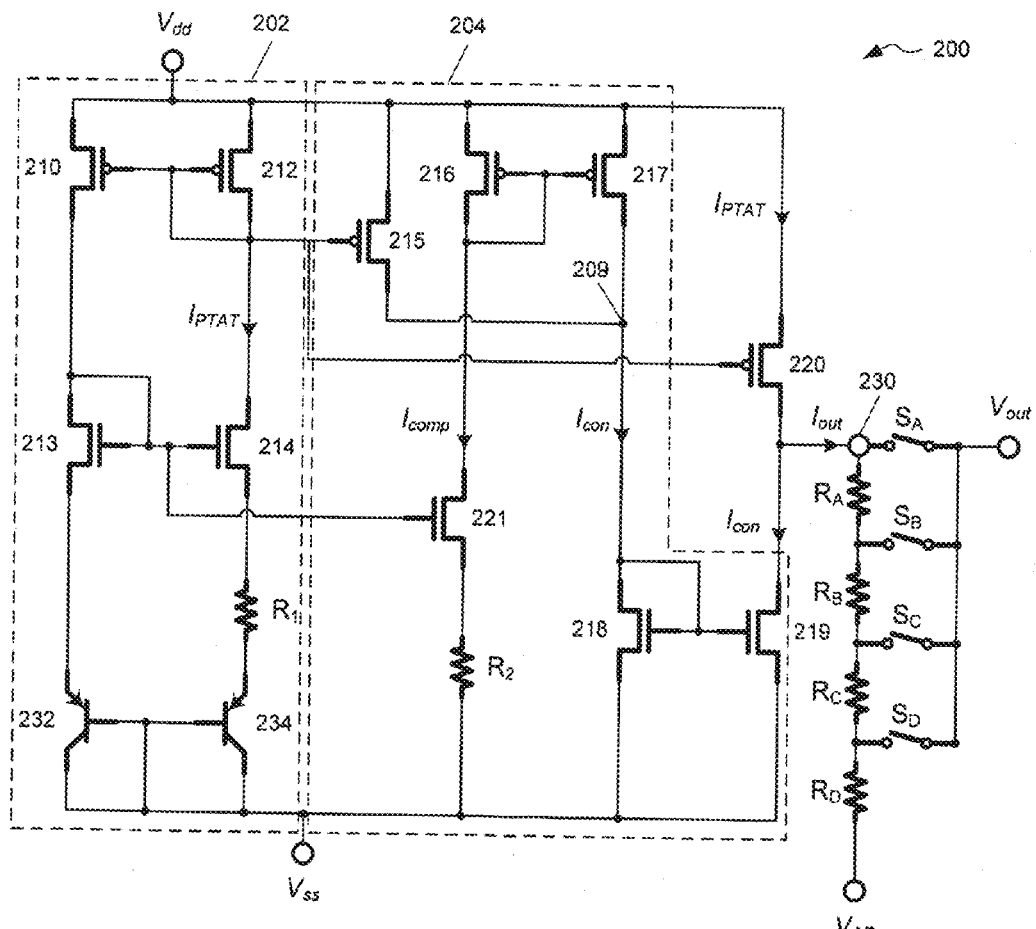
FIG. 2 depicts an integrated temperature sensor, according to one embodiment.

Referring now to FIG. 2, one embodiment of a temperature sensor 200 is shown. The circuit 200 may be fabricated from integrated electronic components (e.g., MOS transistors, bipolar junction transistors, polysilicon resistors, metal or poly interconnects) using CMOS technology, and may be disposed on an integrated circuit chip. Since the temperature sensor 200 can be integrated and fabricated using standard CMOS technology, the temperature sensor can be produced at low cost. Further, the temperature sensor may be readily combined with other integrated circuits (e.g., a multi-pixel imaging sensor, a circuit with analog-to-digital converters) to sense temperature locally on chip. The temperature sensor uses a small number of components (approximately 12 transistors and two resistors), and therefore requires a small amount of real estate on a chip. In some embodiments, the temperature sensor may consume less than a few 10's of microwatts of power when in operation.

The temperature sensor 200 may be placed in thermal contact with an object or region for which temperature is to be monitored, and may provide an output current $I_{out}$ that is proportional to the temperature of the object or region. According to one embodiment, the output current may rise from a zero value that corresponds to a selectable reference temperature. The reference temperature, or zero-crossing value, may be tuned by varying resistors $R_1$, $R_2$ within the sensor 200.

In overview, the temperature sensor 200 may include a temperature-sensing circuit 202, a current source 204, an output transistor 220, and an output terminal 230 that is coupled to a main terminal of the output transistor 220. The temperature sensor is configured to combine a current $I_{PTAT}$ that is proportional to absolute temperature and a substantially fixed current $I_{con}$ at an output node to produce the output current $I_{out}$. The current $I_{PTAT}$ may be produced at the output transistor 220 by a control signal applied to the gate of the output transistor. The control signal may be received from a first output of the temperature-sensing circuit 202. The fixed current $I_{con}$ may be produced by the current source 204, and may maintain a substantially constant value independent of temperature. The value of $I_{con}$ may be adjusted or tuned by varying resistor values $R_1$, $R_2$ within the sensor 200. Varying the value of $I_{con}$ may shift the zero-crossing value of $I_{out}$, as explained in further detail below.

In some embodiments, the temperature-sensing circuit 202 may comprise two circuit branches, each configured to couple between a first voltage supply $V_{dd}$ and a second voltage supply $V_{ss}$. According to one embodiment, the second voltage supply is at ground potential. In a first circuit branch, there may be a field-effect transistor (FET) 210 of a first type coupled in series with a field-effect transistor 213 of a second type. A transistor of a first type may be a p-channel FET, and a transistor of a second type may be an n-channel FET. FET 213 may be diode connected. There may also be a bipolar junction transistor (BJT) 232 in the first circuit branch of the temperature-sensing circuit 202, and coupled in series with transistors 210 and 213.

The second branch to the temperature-sensing circuit 202 may comprise a FET 212 of the first type coupled in series with a FET 214 of the second type. FET 212 may be diode connected and configured in a current-mirror relationship with FET 210. FET 214 may be configured in a current-mirror relationship with FET 213. The second branch of the temperature-sensing circuit 202 may also include a resistor $R_1$ and a BJT 234 coupled in series with transistors 214 and 212 as shown. BJT 234 may be configured in a current-mirror relationship with BJT 232 of the first branch. The base of BJTs 232 and 234 may be configured to be biased by the second voltage supply $V_{ss}$.

In various embodiments, the junction area in BJT 234 is smaller than the junction area in BJT 232, so that the current density in BJT 234 is higher than the current density in BJT 232 when both BJTs are conducting current. In some embodiments, the current density in transistor 234 is higher than the current density in transistor 232 by about a factor of eight, though other values may be used. For example, the ratio of current densities in transistors 234 and 232 may be between about 2 and about 4 in some embodiments, between about 4 and about 8 in some embodiments, between about 8 and about 16 in some embodiments, and yet between about 16 and about 32 in some embodiments.

Because of the difference in BJT current densities and base-to-emitter voltages that are dependent upon both temperature and current density, the temperature-sensing circuit 202 produces a current $I_{PTAT}$ that is proportional to absolute temperature in each branch of the temperature-sensing circuit. For example, the current rises from a zero value at 0 Kelvin. Further details of producing a current proportional to absolute temperature with a pair of BJTs can be found in a publication to Bakker and Huij sing (IEEE Journal of Solid State Circuits, Vol. 31, No. 7 (1996) pp. 933-937), which is incorporated by reference.

According to the embodiment depicted in FIG. 2, a first output from the temperature-sensing circuit 202 may be provided from a node common to the gates of transistors 210 and 212. The first output may be coupled to a gate of output transistor 220 to produce a current proportional to absolute temperature $I_{PTAT}$ at the output transistor. Output transistor 220 may be configured in a current-mirror relationship with transistors 210 and 212.

A second output from the temperature-sensing circuit 202 may be provided from a node common to the gates of transistors 213 and 214. The second output may be coupled to a gate node of a field-effect transistor 221 in a first branch of the current source 204. Transistor 221 may be configured as a source follower. It will be appreciated that the voltage at the gates of transistors 213 and 214 will vary in a manner opposite that at the gates of transistors 211 and 212, since transistors 213 and 214 are of a different type than transistors 211 and 212. Accordingly, transistor 221 will produce a current $I_{comp}$ in the first branch of current source 204 that varies in a manner opposite the temperature dependence of $I_{PTAT}$.

In some embodiments, the current source 204 comprises two circuit branches, each configured to couple between the first supply voltage $V_{dd}$ and the second supply voltage $V_{ss}$. The first branch of the current source 204 may comprise the transistor 221 of the second type in series with a resistor $R_2$ and in series with a FET 216 of the first type. The transistor 216 may be diode connected.

The second branch of the current source 204 may comprise a FET 217 of the first type coupled in series with a FET 218 of the second type. The transistor 217 may be configured in a current-mirror relationship with the transistor 216. The transistor 218 may be diode connected, and configured in a current-mirror relationship with a FET 219 of the second type. Transistor 219 may have a first main terminal coupled to a main terminal of output transistor 220 and a second main terminal configured to couple to the second supply $V_{ss}$.

The current source may further include a FET 215 of the first type configured in a current-mirror relationship with transistors 210 and 212. A first main terminal of transistor 215 may be configured to couple to the first supply $V_{dd}$ and a second main terminal may be coupled to the second branch of the current source 204 between transistors 217 and 218. Since transistor 215 is configured in a current-mirror relationship with transistors 210 and 212, it will provide a current proportional to absolute temperature $I_{PTAT}$ into the second branch of the current source.

As may be appreciated, current $I_{comp}$ that flows in the first branch of current source 204 will be mirrored into the second branch by transistors 216 and 217. Accordingly, the current source 204 may be configured to combine the current $I_{PTAT}$ with the current $I_{comp}$, e.g., at node 209. Since the temperature dependencies of these two currents is substantially opposite, as described above, the resulting current $I_{con}$ is substantially constant with temperature. $I_{con}$ flows in the lower portion of the second branch of current source 204, and is mirrored to be drawn from an output node by transistors 218 and 219.

Subtracting a substantially constant current $I_{con}$ from the current that is proportional to absolute temperature $I_{PTAT}$ at the output node of the temperature sensor effectively shifts the zero-crossing or zero-intercept point of $I_{PTAT}$ to a value other than absolute 0. The new zero-crossing value can be used to correspond to a reference temperature. The value of the reference temperature may be determined by theory or a calibration measurement. The amount of shift can be tuned by varying values of resistors $R_1$ and $R_2$. In certain embodiments, $R_1$ is approximately equal to $R_2$, and both values are varied together. Accordingly, the output current $I_{out}$ represents a current that is proportional to temperature rising from a zero-value at a selected reference temperature.

Figure 3:
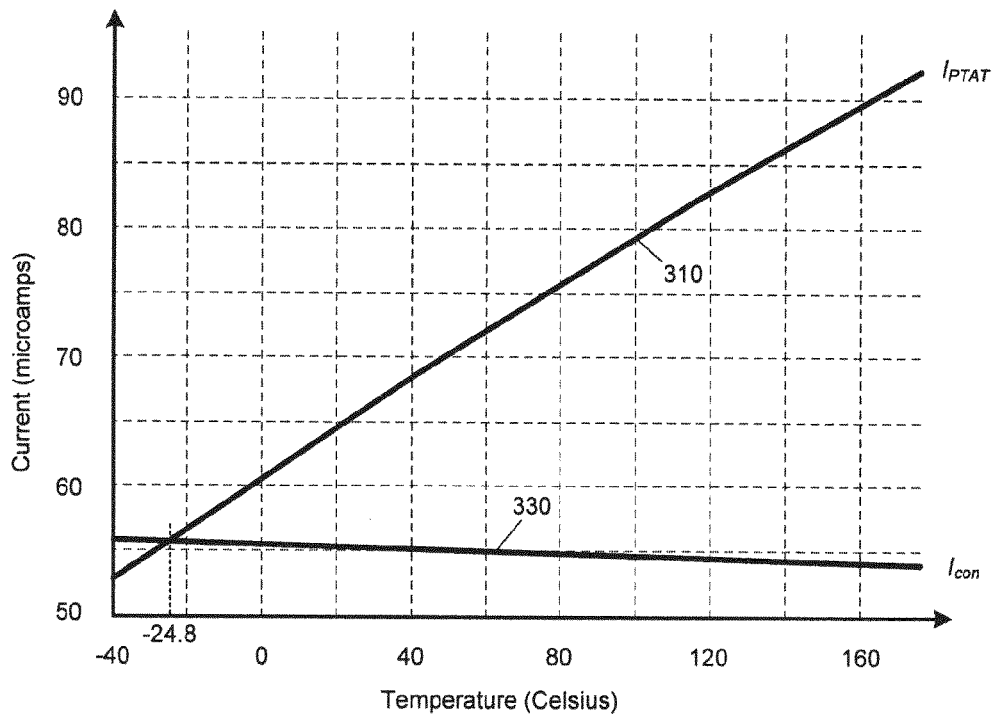
FIG. 3 depicts current values from transistor 219 and to transistor 220 as a function of temperature for the circuit shown in FIG. 2, according to one embodiment.
Figure 4A:
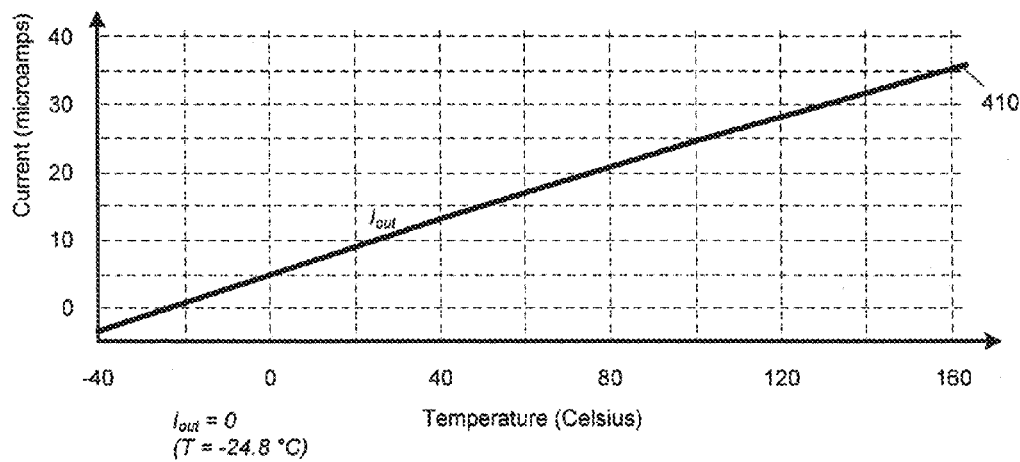
FIG. 4A shows output current $I_{out}$ measured from the output terminal 230 of the temperature sensor as a function of temperature, according to one embodiment.

The shift in the zero-crossing value of $I_{PTAT}$ can be appreciated from the plots of FIG. 3. The data was measured for one embodiment of the temperature sensor. The data shows a first trace 310 of $I_{PTAT}$ measured as a function of temperature (in degrees Celcius) flowing into the output node from output transistor 220. The second trace 330 represents $I_{con}$ measured as a function of temperature flowing out of the output node to transistor 219. The second trace 330 shows that the fixed current $I_{con}$ has a small temperature dependence, but varies less than about ±5% over a range of about 200° C. In some embodiments, $I_{con}$ varies less than about ±10% over a range of about 200° C. In other embodiments, $I_{con}$ varies less than about ±2% over a range of about 200° C. Subtracting $I_{con}$ from $I_{PTAT}$ yields $I_{out}$ in which the zero-intercept value is shifted from absolute zero for $I_{PTAT}$ to a zero-crossing for $I_{out}$ at about −25° C. FIG. 4A shows a plot of $I_{out}=I_{PTAT}-I_{con}$, and shows the output current 410 rising from a zero value at about −25° C.

In some implementations, the output terminal 230 may provide an output current $I_{out}$ that is proportional to temperature sensed by the temperature sensor 200, e.g., as depicted in FIG. 4A. In certain embodiments, current-to-voltage conversion circuitry may be coupled to the output terminal 230 of the temperature sensor 200, and configured to convert the output current $I_{out}$ to an output voltage $V_{out}$ that is proportional to temperature. The current-to-voltage conversion circuitry may provide selectable output gain settings.

TABLE 1

| gain | configuration | $V_{out}$ |
| --- | --- | --- |
| $G_1$ | only $S_A$ closed | $V_{AB} + I_{out}(R_A + R_B + R_C + R_D)$ |
| $G_2$ | only $S_B$ closed | $V_{AB} + I_{out}(R_B + R_C + R_D)$ |
| $G_3$ | only $S_C$ closed | $V_{AB} + I_{out}(R_C + R_D)$ |
| $G_4$ | only $S_D$ closed | $V_{AB} + I_{out}(R_D)$ |

One embodiment of current-to-voltage conversion circuitry is depicted in FIG. 2. For this embodiment, the output terminal 230 of the temperature sensor 200 is coupled to a resistor ladder ($R_A$, $R_B$, $R_C$, $R_D$) and bank of switches ($S_A$, $S_B$, $S_C$, $S_D$) as shown. One end of the resistor ladder is coupled to a voltage supply $V_{AB}$. The output voltage $V_{out}$ can be given approximately by the relations shown in Table 1. The switches ($S_A$, $S_B$, $S_C$, $S_D$) may be controlled manually (e.g., manually set at the factory or by a user), or the switches may be controlled internally by a circuit coupled to the temperature sensor (e.g., controlled by an internal automatic gain control circuit or other gain-adjustment circuit). In some implementations, the current-to-voltage circuitry may be patterned on the same chip as the temperature sensor 200, and packaged together with the temperature sensor.

Figure 4B:
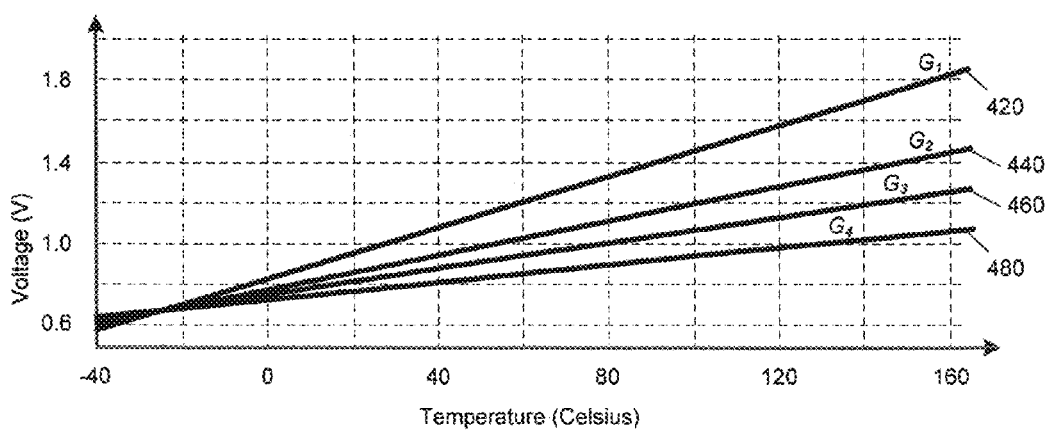
FIG. 4B shows output voltage $V_{out}$ from the current-to-voltage conversion circuitry of FIG. 2 as a function of temperature (° C.) for various output gain settings. The sensor shows a stable zero-crossing value (reference temperature) that is independent of output gain settings.

In various embodiments, the zero-crossing value of the output current $I_{out}$ is stable irrespective of the gain selected at the output terminal 230. FIG. 4B shows plots of $V_{out}$ 420, 440, 460, 480 measured as a function of temperature for the circuit shown in FIG. 2 at four respective different gain settings $G_1$, $G_2$, $G_3$, $G_4$. The configuration of the circuit for each gain setting is indicated in Table 1. The trace 410 of FIG. 4A was measured for each gain setting shown in FIG. 4B yielding substantially the same result. As can be seen, the zero-crossing value of $I_{out}$ and it slope remain stable independent of gain setting at the output of temperature sensor 200.

For the configuration of current-to-voltage conversion circuitry shown in FIG. 2, the output voltage $V_{out}$ is referenced to voltage $V_{AB}$. In some implementations, $V_{AB}$ may vary with time, e.g., due to temperature changes or fluctuations in a voltage supply. In some embodiments, variations in $V_{AB}$ will be automatically tracked in the output $V_{out}$. In one embodiment, variations in $V_{AB}$ that are due to temperature changes may be substantially cancelled by temperature sensor 200. For example, an output gain may be selected such that variations in $V_{AB}$ due to temperature are substantially cancelled by temperature dependent signal $I_{out}(R_{out})$ where $R_{out}$ is the effective resistance of an output resistor ladder. Such an embodiment may be used to provide a temperature-independent voltage reference or voltage supply.

In some implementations, the temperature sensor may be configured such that the zero-crossing value of $I_{out}$ establishes a minimum sensed temperature. For example, $V_{out}$ may be clipped below $V_{AB}$, the value of $V_{out}$ when $I_{out}=0$. Regardless of whether or not the output voltage is clipped, a measured output voltage of $V_{AB}$ would correspond to the zero-crossing reference temperature, e.g., about −25° C. for the embodiment depicted in FIG. 4A.

Figure 5A:
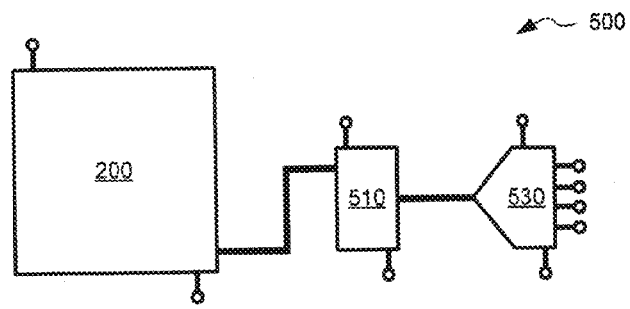
FIG. 5A depicts incorporation of the temperature sensor into an integrated circuit, according to one embodiment.

FIG. 5A depicts one embodiment of a temperature sensor 200 incorporated in an integrated circuit 500. The integrated circuit may be part of a temperature-sensing circuit for an environmental control system, or part of a temperature-sensing circuit for a machine or electronic device. In some embodiments, the integrated circuit may be incorporated in an imaging device (e.g., a digital camera or portable electronic device having image-capture capability). The integrated circuit may comprise a temperature sensor 200 coupled to a current-to-voltage converter 510, which is coupled to an analog-to-digital converter (ADC) 530. The ADC 530 may convert an analog voltage signal $V_{out}$ to a multi-bit digital data signal.

Figure 5B:
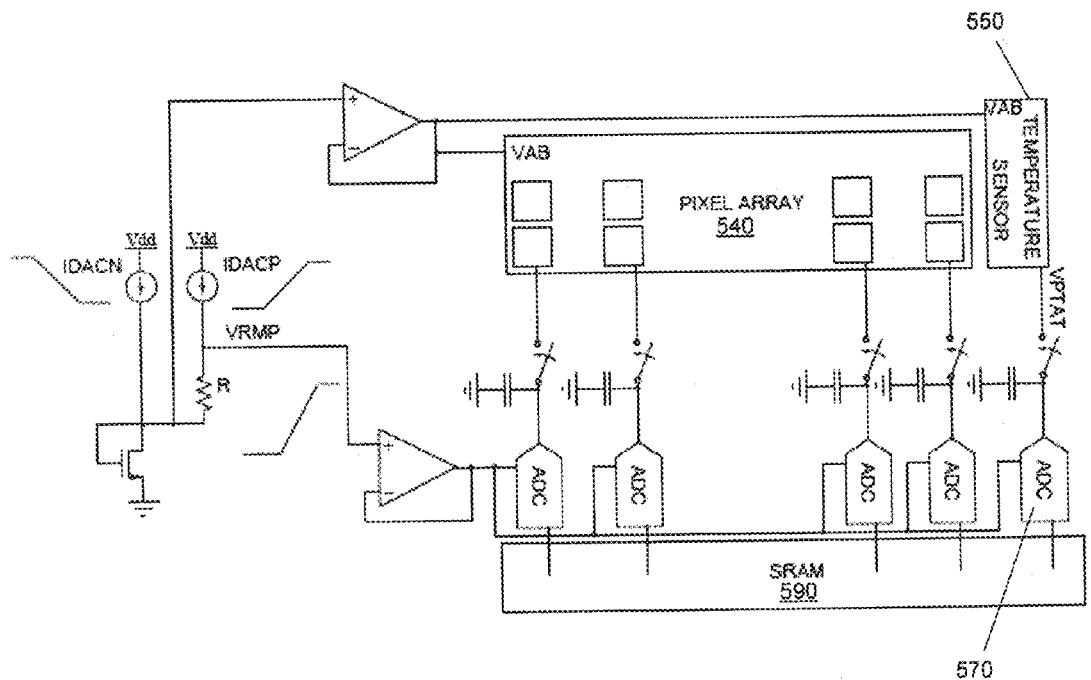
FIG. 5B illustrates incorporation of a temperature sensor into image-sensing circuitry, according to one embodiment.

The temperature sensor 550 may be incorporated in an image sensing circuit as depicted in FIG. 5B. According to the embodiment shown, the temperature sensor 550 includes a current-to-voltage conversion circuit that receives a reference voltage $V_{AB}$. The output of the temperature sensor may be converted to a digital signal by ADC 570 for storage in memory 590 and/or for subsequent signal processing. The ADC 570 may be an ADC that is similar to those used for photosignal conversion by the imaging pixel array 540. Accordingly, digital conversion circuitry common to the imaging device can be used for the temperature sensor 550. In some embodiments, reference voltage $V_{AB}$ may be used to establish a base signal for a voltage ramp $V_{RMP}$ applied to the analog-to-digital converters for the ADC process. Any fluctuations in $V_{AB}$ that would affect analog-to-digital conversion can be tracked by the temperature sensor 550, such fluctuations in the analog-to-digital conversion at the converter 570 are substantially matched and cancelled by reference-voltage fluctuations induced in the output of the temperature sensor 550. In some embodiments, the reference voltage $V_{AB}$ may also be applied to the imaging pixel array 540 to establish a no-signal level or dark-level for each pixel.

When incorporated in an image sensing device, automatic gain control (AGC) may be employed by the image sensing device to scale photosignals to utilize substantially all of the dynamic range of the ADC's. However, such scaling applied to the temperature sensor 550 would lead to an erroneous temperature value. In some embodiments, output gain settings on the temperature sensor's current-to-voltage conversion circuitry can be adjusted to offset AGC settings applied by the image sensing device. For example, at low light levels the gain of signals from the imaging pixels 540 may be increased, e.g., by a factor of about 2. To offset this increase, switches in current-to-voltage conversion circuitry may be selected to reduce the output voltage swing of the temperature sensor 550, e.g., by a same factor of about 2. Increases in gain due to AGC and corresponding reductions in the sensor's output gain may be any factor other than 2 is some cases.

Figure 6:
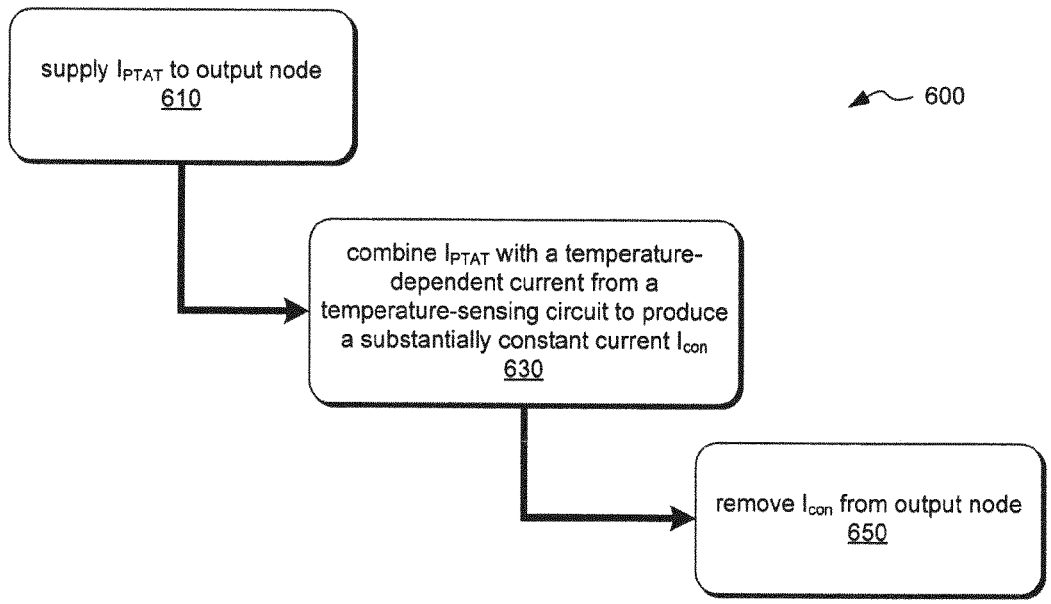
FIG. 6 depicts acts of a method for producing a current proportional to temperature with a temperature sensor, according to one embodiment.

One embodiment of a method 600 for producing a current proportional to temperature with a temperature sensor is illustrated by the flow diagram of FIG. 6. The method may comprise acts of supplying 610 a current proportional to absolute temperature $I_{PTAT}$ to an output node of the temperature sensor. The current may be obtained from a temperature-sensing circuit, e.g., as described above in connection with FIG. 2. The method 600 may further comprise combining 630 a current proportional to absolute temperature $I_{PTAT}$ with a temperature-dependent current that effectively cancels the temperature dependence in $I_{PTAT}$. The temperature-dependent current may also be obtained from the temperature-sensing circuit. The combination of the current proportional to absolute temperature and the temperature-dependent current may produce a current $I_{con}$ with a substantially constant value as a function of temperature. The constant value may be selected by selecting and/or adjusting at least one resistive element within the temperature sensor. In some embodiments, two resistors are selected and/or adjusted, one in a temperature-sensing portion of the temperature sensor and one in a current source portion of the temperature sensor. The method 600 may further comprise removing 650 the substantially constant current $I_{con}$ from the output node. There may be additional or fewer acts associated with the method 600.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, though transistors of a first type (PMOS) may have been shown in the drawings, transistors of a second type (NMOS) may be used instead, and vice versa, with voltage supplies and/or circuit topology changed accordingly to maintain substantially similar circuit functionality. In some instances, signal polarities may be reversed or inverted. Also, attenuators, amplifiers, or buffers may be inserted in a signal line. Such modifications may be made to the disclosed circuits without substantially modifying the functionality of the disclosed circuits, and circuits modified accordingly should be considered equivalent to the disclosed circuits.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element or item in the specification does not by itself connote any priority, presence or order of one element over another. In addition, the use of an ordinal term does not by itself connote a maximum number of elements having a certain name that can be present in a claimed device or method. Any suitable number of additional elements may be used unless a claim requires otherwise. Ordinal terms are used in the claims merely as labels to distinguish one element having a certain name from another element having a same name. The use of terms such as "at least one" or "at least a first" in the claims to modify a claim element does not by itself connote that any other claim element lacking a similar modifier is limited to the presence of only a single element. Any suitable number of additional elements may be used unless a claim requires otherwise. The use of "including," "comprising," or "having," "containing," "involving," and variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one."

The terms "substantially equivalent to" and "approximately equal to" and their equivalents should be understood to mean that a first element is equivalent to or nearly equivalent to a second element. In some embodiments, the degree of equivalence may be within about ±2%, in some embodiments within about ±5%, in some embodiments within about ±10%, and yet in some embodiments within about ±20%.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A temperature sensor, comprising:
    a first output transistor having first and second conduction terminals, the first conduction terminal coupled to a first voltage supply so that the first output transistor is configured to generate a first current proportional to absolute temperature from the second conduction terminal;
    a current source coupled to the second conduction terminal and configured to draw a constant reference current from the second conduction terminal; and
    an output terminal coupled to the second conduction terminal and configured to output an output current proportional to the absolute temperature for temperatures in excess of a first reference temperature;
    wherein the value of the constant reference current determines a zero-crossing value of the output current.

2. The circuit of claim 1, wherein the zero-crossing value of the output current is at the first reference temperature.

3. The circuit of claim 1, further comprising a first resistive value in a temperature-sensing circuit coupled to the first output transistor and a second resistive value in the current source that adjust the zero-crossing value to be at a second reference temperature.

4. The circuit of claim 1, wherein the constant reference current is independent of temperature of the temperature-sensing circuit.

5. The circuit of claim 1, wherein the constant reference current varies less than about 5 microamps over a temperature range of about 200 Celsius for the temperature-sensing circuit.

6. The circuit of claim 1, wherein the zero-crossing value corresponds to a selected reference temperature.

7. The circuit of claim 1, further comprising a temperature-sensing circuit wherein a control terminal of the first output transistor is coupled to the temperature-sensing circuit.

8. The circuit of claim 7, wherein the temperature-sensing circuit comprises:
    a first circuit branch configured to couple between a first voltage supply and a second voltage supply;
    a second transistor of a first type in the first circuit branch;
    a third transistor of a second type coupled in series with the second transistor;
    a first bipolar junction transistor coupled in series with the third transistor;
    a second circuit branch configured to couple between the first voltage supply and the second voltage supply;

a fourth transistor of the first type in the second circuit branch and configured in a current mirror relationship with the second transistor;
a fifth transistor of the second type in series with the fourth transistor and configured in a current mirror relationship with the third transistor;
a resistor in series with the fifth transistor; and
a second bipolar junction transistor coupled in series with the resistor and configured in a current mirror relationship with the first bipolar junction transistor.

9. The circuit of claim 8, wherein a control terminal of the second transistor is coupled to a control terminal of the first output transistor, and the conduction terminal of the first output transistor is coupled to the first supply voltage.

10. The circuit of claim 8, wherein a control terminal of the fifth transistor is coupled to provide a temperature-dependent current in the current source.

11. The circuit of claim 8, wherein the second bipolar junction transistor is configured to exhibit a higher current density flow than the first bipolar junction transistor.

12. The circuit of claim 11, wherein the higher current density flow is by a factor of about 8.

13. The circuit of claim 1, wherein the current source is configured to combine a second current proportional to absolute temperature with a temperature-dependent current to provide the constant reference current.

14. The circuit of claim 13, wherein the current source comprises:
a first circuit branch configured to couple between a first voltage supply and a second voltage supply;
a second transistor of a first type in the first circuit branch;
a third transistor of a second type coupled in series with the second transistor;
a resistor in series with the third transistor;
a second circuit branch configured to couple between the first voltage supply and the second voltage supply;
a fourth transistor of the first type in the second circuit branch and configured in a current mirror relationship with the second transistor; and
a fifth transistor of the second type in series with the fourth transistor.

15. The circuit of claim 13, wherein the second current proportional to absolute temperature is added to the second circuit branch by a sixth transistor having a control terminal coupled to a first output of a temperature-sensing circuit, and the temperature-dependent current is provided in the first circuit branch by the third transistor having a control terminal coupled to a second output of the temperature-sensing circuit.

16. The circuit of claim 15, wherein the temperature-dependent current has an opposite dependence on temperature than the second current proportional to absolute temperature.

17. The circuit of claim 16, further comprising a seventh transistor of the second type coupled in series with the first output and configured in a current mirror relationship with the fifth transistor.

18. A method for providing an output current proportional to temperature, the method comprising:
supplying a first current proportional to absolute temperature to a node of a temperature sensor;
removing a constant reference current from the node; and
outputting a second current proportional to absolute temperature from the node when temperature exceeds a first reference temperature;
wherein the value of the constant reference current determines a zero-crossing value of the second current.

19. The method of claim 18, wherein the constant reference current is selected to determine a zero-crossing value of the second current.

20. The method of claim 18, wherein the supplying comprises providing a first control signal from a first output of a temperature-sensing circuit to a control terminal of a first transistor to control the first transistor to supply the first current proportional to absolute temperature.

21. The method of claim 20, wherein the removing comprises providing a second control signal from a current source to control terminal of a second transistor coupled in series with the first transistor.

22. The method of claim 21, further comprising:
providing a third control signal to the current source from a second output of the temperature-sensing circuit; and
combining, in the current source, the second current proportional to absolute temperature with a temperature-dependent current to provide the constant reference current.

23. The method of claim 22, wherein the temperature-dependent current has an opposite temperature dependence than the second current proportional to absolute temperature.

24. The method of claim 20, wherein a zero-crossing value of the output current is determined by a first resistive value in the temperature-sensing circuit and a second resistive value in the current source.

25. The method of claim 20, further comprising:
flowing a second current in a first circuit branch of the temperature-sensing circuit, wherein the first circuit branch comprises:
a second transistor of a first type;
a third transistor of a second type coupled in series with the second transistor; and
a first bipolar junction transistor coupled in series with the third transistor; and
flowing a third current in a second circuit branch of the temperature-sensing circuit, wherein the second circuit branch comprises:
a fourth transistor of the first type in a current mirror relationship with the second transistor;
a fifth transistor of the second type in series with the fourth transistor and configured in a current mirror relationship with the third transistor;
a resistor in series with the fifth transistor; and
a second bipolar junction transistor coupled in series with the resistor and configured in a current mirror relationship with the first bipolar junction transistor.

26. The method of claim 20, wherein the constant reference current varies less than about 5 microamps over a temperature range of about 200 Celsius for the temperature-sensing circuit.

27. The method of claim 18, further comprising:
flowing a second current in a first circuit branch of the current source, wherein the first circuit branch comprises:
a second transistor of a first type in the first circuit branch;
a third transistor of a second type coupled in series with the second transistor; and
a resistor in series with the third transistor; and
flowing a third current in a second circuit branch of the current source, wherein the second circuit branch comprises:
a fourth transistor of the first type in the second circuit branch and configured in a current mirror relationship with the second transistor; and a fifth transistor of the second type in series with the fourth transistor.

28. A method, comprising:

generating a first current proportional to absolute temperature and containing temperature variant and temperature invariant portions;

generating a second current inverse to the first current and having temperature variant and temperature invariant portions;

summing the first current and the second current so as to generate a third current that is temperature invariant;

generating an output current that is temperature variant by subtracting the third current from the first current;

wherein the value of the third current determines a zero-crossing value of the first current.

29. The method of claim 28, wherein the first current being greater than the third current indicates that the absolute temperature is above a threshold temperature.

\* \* \* \* \*